United States Patent
Vaughn et al.

(10) Patent No.: US 6,661,893 B1
(45) Date of Patent: Dec. 9, 2003

(54) TELEPHONE LOOP MONITORING AND ISOLATION SYSTEM

(76) Inventors: Kenneth Vaughn, 5417 Castleview La., Garland, TX (US) 75004; Richard K. Gerlach, 32 Santa Bella Rd., Rolling Hills Estates, CA (US) 90724

( * ) Notice: Subject to any disclaimer, the term of this patent is extended or adjusted under 35 U.S.C. 154(b) by 0 days.

(21) Appl. No.: 09/376,541

(22) Filed: Aug. 18, 1999

(51) Int. Cl.[7] .............................. H04M 1/00; H04M 9/00
(52) U.S. Cl. .................. 379/399.01; 379/2; 379/93.05; 379/177
(58) Field of Search ...................... 379/1.01, 2, 32.01, 379/32.04, 33, 399.01, 404, 413.02, 413.03, 414, 423, 93.05, 93.07, 93.11, 171, 177; 455/404, 405, 426, 445, 554, 557

(56) References Cited

U.S. PATENT DOCUMENTS

| | | | | | |
|---|---|---|---|---|---|
| 4,197,435 A | * | 4/1980 | Jackson et al. | ................. | 379/2 |
| 4,726,048 A | * | 2/1988 | Waldman et al. | ............... | 379/2 |
| 5,751,789 A | * | 5/1998 | Farris et al. | ................... | 379/34 |
| 6,005,934 A | * | 12/1999 | Pepper | ....................... | 379/398 |
| 6,078,661 A | * | 6/2000 | Arnett et al. | .......... | 379/413.04 |
| 6,229,890 B1 | * | 5/2001 | Kerr et al. | ............. | 379/413.02 |
| 6,322,375 B1 | * | 11/2001 | Cole et al. | ................. | 439/76.1 |
| 6,411,802 B1 | * | 6/2002 | Cardina et al. | ............. | 455/404 |

* cited by examiner

*Primary Examiner*—Binh Tieu

(57) ABSTRACT

A telephone loop monitoring and isolation device which can be connected to a wireless telephone subscriber unit providing an interface between an analog or digital central station network and the internal telephone wiring of a subscribers premises. The device is also operable with a cable telephone subscriber unit. The device provides passive real time loop status information as well as loop isolation if the voltage across the loop falls below a predetermined level. When normal loop impedance conditions are restored, the subscriber loop is automatically reconnected to the subscriber telephone unit. The device is effective for examining open circuit and abnormal impedance conditions and provides loop status information to the telephone subscriber. The system of the invention also has an alarm enhancement in that it will provide an alarm status indication to a monitoring center, such as a police department or the like, while still maintaining communication capabilities, even during an existing active telephone communication.

11 Claims, 6 Drawing Sheets

TELEPHONE LOOP MONITORING AND ISOLATION SYSTEM

BACKGROUND OF THE INVENTION

1. Field of the Invention

This invention relates in general to certain new and useful improvements in telephone line monitoring apparatus and, more particularly, to a device which is capable of monitoring a wireless subscriber unit which provides an interface between an analog or digital network and a subscriber's premises telephone wiring and isolating of the phone loop when the voltage falls below a predetermined level.

2. Brief Description of the Related Art

Wireless subscriber telephone units are now becoming quite prevalent throughout much of the world. These wireless telephone units include wireless transmitter and a receiver capable of communicating through a subscriber network to a base station located at a cell site. In fact, in many third world countries, wireless telephone subscriber units are becoming more prevalent then in the United States. The subscriber unit also provides an interface to the subscriber premises telephone wiring.

In many cases, there are still telephones which are hard wired to a central station for operation in many countries, as in much of the United States. The wireless telephone units by definition do not operate through a hard wire circuit. Although cordless telephones do operate through a hard wired circuit, they are considered to be hard wired telephone systems and not subject matter for use in the present invention. In addition, many subscriber telephone units are operable with cable subscriber units and, here again, the mode of operation is similar to that of an analog or a digital network.

In the event of an interruption in telephone service, the user of the wireless telephone system is frequently unable to locate the source of the problem. That source may be a malfunctioning telephone unit or it may well be a short or an open circuit in the wiring between the telephone unit and the subscriber unit. Further, a short could exist between the monitoring device and the telephone. Abnormal loop conditions within the subscriber's premises may exist, in effect, between the subscriber unit and the monitor or otherwise between the monitoring unit and the telephone unit. It would be desirable to provide a device which allows for monitoring of a wireless telephone system.

In many cases, the wireless communication to the subscriber's premises may be digital and in many cases it may be a analog. It would therefore be desirable to provide a device which is capable of operating with both digital and analog units to monitor same and which device could also provide for isolation. While a network operator or repair service may be able to determine if a fault has occurred because of the wireless connection, a monitoring device is nevertheless required to determine if there was a fault within the subscriber's premises.

The need for monitoring a telephone loop is also becoming important in those cases where gates and other security accesses are connected directly through a telephone system. It is important to insure that a breach of security does not result by purposely cutting a telephone line or otherwise attempting to interfere with a telephone network. Thus, it would be important to enable monitoring of a system, even where a breach in that system has resulted.

Although there are no known prior art teachings of a solution to the aforementioned deficiencies and shortcomings, such as those disclosed herein, U.S. Pat. No. 4,390,750 to Bartelink (Bartelink), U.S. Pat. No. 4,446,340 to Fryer (Fryer), and U.S. Pat. No. 4,417,137 to Rosenfeld, et. al (Rosenfeld) discuss subject matter that bears some relation to matters discussed herein. Bartelink discloses a remote supervisory system for monitoring the status of a subscriber's premises over existing telephone circuits from the central office. Auxiliary equipment at the subscriber's premises is coupled to the subscriber's telephone circuit and includes sensors which monitor the condition of the premises. If an abnormal condition is sensed, the auxiliary equipment notifies the central office which may further notify an action center at that central office of the subscriber's identity and nature of the alarm.

Fryer discloses a loopback circuit for testing a telephone line between the central office and a subscriber's equipment. The loopback circuit is located at the subscriber's end of the line and is powered by the normal central office power source. Fryer injects a signal from the central office to actively test the telephone line. Thus, Fryer does not provide a stand alone capability, or a passive capability to monitor the subscriber's premises and report alarm conditions without a wire line connection to the central office.

Rosenfeld discloses an apparatus for monitoring the hook status of a remote telephone. Rosenfeld introduces a disturbance voltage signal onto the subscriber loop from the central office, and then monitors variations in impedance in the subscriber loop. Thus, Rosenfeld does not provide a stand alone capability, or a passive capability to monitor the subscriber's premises and report alarm conditions without a wire line connection to the central office.

With any existing wireless telephone system, there is presently on-premise monitoring with a wireless telephone system and an alarm circuit arrangement used in combination therewith. However, where an alarm would occur with an existing alarm apparatus, it is necessary to isolate the telephone wiring of the premises from the alarm circuit, particularly as connected through tip ring conductors, so that the alarm has a priority of use in the communication path to the telephone network. If this is not achieved, an initiation of an alarm signal to a central station or other monitoring facility, such as a police department, will not be enabled. Thus, there is a need as well for a system which will provide the capability of communicating an alarm status, even during an existing telephone call in the premises.

OBJECTS OF THE INVENTION

It is, therefore, one of the primary objects of the present invention to provide a subscriber premises telephone loop monitoring and isolation device which can be installed both internal to or as an adjunct to a wireless subscriber telephone unit.

It is another object of the present invention to provide a subscriber premises telephone loop monitoring and isolation device which is capable of providing an interface between both an analog telephone wireless network and a subscriber premises telephone wiring system.

It is a further object of the present invention to provide a subscriber premises telephone loop monitoring and isolation device of the type stated which is also effective in operating with a cable or wireless subscriber unit and providing a similar mode of operation therefor.

It is an additional object of the present invention to provide a telephone loop monitoring and isolation device of the type stated which provides passive and real time loop status information to a subscriber unit, as well as loop isolation if the voltage across the loop falls below a predetermined value.

It is another object of the present invention to provide a monitoring and isolation device for use on the subscriber's premises, of the type stated, which will automatically provide a loop-cut through between the telephone unit and the subscriber unit even if a power failure occurs during an active telephone communication.

It is also an object of the present invention to provide a telephone loop monitoring and isolation device of the type stated which is capable of automatically restoring normal telephone loop operation when the impedance conditions are restored to a proper level and the subscriber's premises loop is automatically reconnected to the subscriber unit.

It is still another object of the present invention to provide a telephone,loop monitoring and isolation device of the type stated in which loop status information can be provided directly to a subscriber via the telephone loop monitoring and isolation device.

It is another salient object of the present invention to provide a method of monitoring a wireless subscriber telephone unit between an analog or a digital wireless network and isolating same when voltage across the loop drops below a predetermined value and to automatically restore operation when loop impedance conditions have been restored.

It is still a further object of the present invention to provide a system which enables alarm status indication through a subscriber unit in a wireless network operation so that a signal path can be maintained simultaneously to a voice or data telephone call while still providing an alarm signal.

With the above and other objects in view, our invention resides in the novel features of form, construction, arrangement and combination of parts and components presently described and pointed out in the claims.

BRIEF SUMMARY OF THE INVENTION

A telephone loop monitoring and isolation device which may be in the form of a small box-like unit having a size substantially less than a hand-held subscriber telephone unit. The device of the present invention may be arranged to be internal with or otherwise used as an adjunct to a wireless subscriber unit. The device of the invention which provides both monitoring and isolation will thereby provide an interface between both an analog or a digital wireless network and a subscriber's premises telephone wiring system.

The device of the invention is also operable with a cable subscriber unit in which the modes of operation are similar to those of a wireless subscriber telephone unit. The monitoring device is effective in that it will provide both passive real time loop status information through an interface to the subscribers telephone unit. The device of the invention will also provide loop isolation if the voltage across the loop falls below a predetermined voltage level as, for example, a 5 volt DC level. In like manner, it will also provide isolation if the loop is short-circuited, such as if the voltage falls to zero or a low voltage such as one volt.

When normal loop impedance conditions are restored, such that the voltage may be elevated back to a voltage above five volts, and the impedance is established to the predetermined value, the subscriber's premises telephone loop is automatically reconnected to the subscriber unit. In this way, normal telephone operation is restored and the updated loop status is communicated to the subscriber unit by the telephone loop monitoring and isolation device of the invention.

If the telephone loop monitoring and isolation device is not internal to the subscriber telephone unit, that is, not integral with the subscriber unit as a single unit, the status of the loop interconnecting the telephone loop and the monitoring and isolation device is also checked for open circuit conditions or otherwise abnormal impedance conditions. In addition, the device of the invention will automatically provide status information to the subscriber preferably, although not limited to, visual loop status information. In addition, operation in a "stand alone" mode of operation can be obtained by connecting the telephone loop monitoring and isolation device directly to an analog telephone network. It should be recognized that any connection to a cable or wireless network must be through a subscriber unit, thereby providing both monitoring of the loop and of the subscriber's premises wiring. The status information is also available in this latter mode of operation by interfacing to a home/office monitoring system, if desired.

The monitoring and isolation device of the present invention is operable in numerous circuit configurations as, for example, with a wireless subscriber telephone unit and with the monitoring and isolation device functioning either external to or otherwise internal to the wireless subscriber telephone unit. The device can also be operated with a cable subscriber unit, as previously described. In addition, the telephone monitoring and isolation device of the invention is operable with no subscriber unit, such that telephone service to the subscriber's premises is provided by a copper loop interface through a public switched telephone network.

When it is desired to isolate a specific loop within a premise and an associated telephone system connected to the loop, an additional telephone loop monitoring and isolation device of the invention can be used. The placement of the device in this case also is exemplary of the situation in which a fax and a telephone are both connected to a common telephone loop. In this case, the status of the loop can be monitored and fault isolation can also be obtained supplementary to the monitoring device integration with the unit. Further, the telephone loop monitoring and isolation device of the invention could be integrated into a power surge suppressor for providing both surge protection and loop status monitoring information and fault isolation.

The circuit arrangement forming part of the monitoring and isolation device of the present invention is specifically divided into several circuits and include, for example, a sensing circuit which senses initial voltages on the subscriber line and particularly on the link between the central telephone switching station and the subscriber unit, the tip-ring paired conductors from the subscriber unit to the monitoring and isolation unit of the invention and the tip ring pair of conductors from the monitoring and isolation device to the telephone.

A comparator circuit receives the input voltages and compares these input voltages against reference voltage levels so as to determine if there is a short or an open circuit condition on any of the lines previously described. Connected to the output of the comparator circuit is an indicator circuit. This indicator circuit provides transistor logic level inputs which can be connected directly to the subscriber unit for alerting the subscriber unit to potential deleterious conditions. The indicator circuit also provides voltages for light emitting diodes or other indicators, such as sound indicators or the like, to alert a user of a short or open circuit condition or, otherwise, even a normal circuit condition.

The present invention further includes an isolation circuit which will provide circuit isolation along with a relay circuit. The isolation circuit and the relay circuit operate in conjunction with one another in order to isolate the unit in the event there is a short or open circuit condition in the telephone loop.

In accordance with the present invention, there is also an alarm status interface with the telephone loop monitoring and isolation device of the invention. In the situation where the subscriber unit is in conjunction with a wireless telephone system or cable interface, when replacing the traditional tip-ring connection to the subscriber's premises, an alarm output would formerly have to be re-routed to the subscriber unit. Thus, if an alarm would occur with an existing alarm monitor apparatus, it would be necessary to isolate the telephone premises wiring from the alarm tip-ring circuit so that the alarm would have priority use in a communication path. If this prioritization is not achieved, then a call from an existing subscriber premises will not be enabled, and will effectively "busy" out the wireless or wire line loop to the central office. This would, in turn, block an alarm call to a monitoring center.

In accordance with the present invention, there is provided an alarm status indication through the subscriber unit back to the monitoring service center or otherwise back to a wireless network operator. With this enhanced signaling path, there can be maintained a simultaneous voice and data telephone call along with an alarm status signal. A signaling path from the subscriber unit delivers an alarm status through a TTL path to the subscriber unit. This TTL path will communicate the alarm status even during an existing and active telephone call at the premises. The invention will also provide subscriber loop isolation so that the alarm unit will have priority of a connection over the tip-ring terminal of the subscriber unit.

This invention possesses many other advantages and has other purposes which may be made more clearly apparent from a consideration of the forms in which it may be embodied. These forms are shown in the drawings forming a part of and accompanying the present specification. They will now be described in detail for purposes of illustrating the general principles of the invention. However, it is to be understood that the following detailed description and the accompanying drawings are not to be taken in a limiting sense.

BRIEF DESCRIPTION OF THE DRAWINGS

Figure 1:
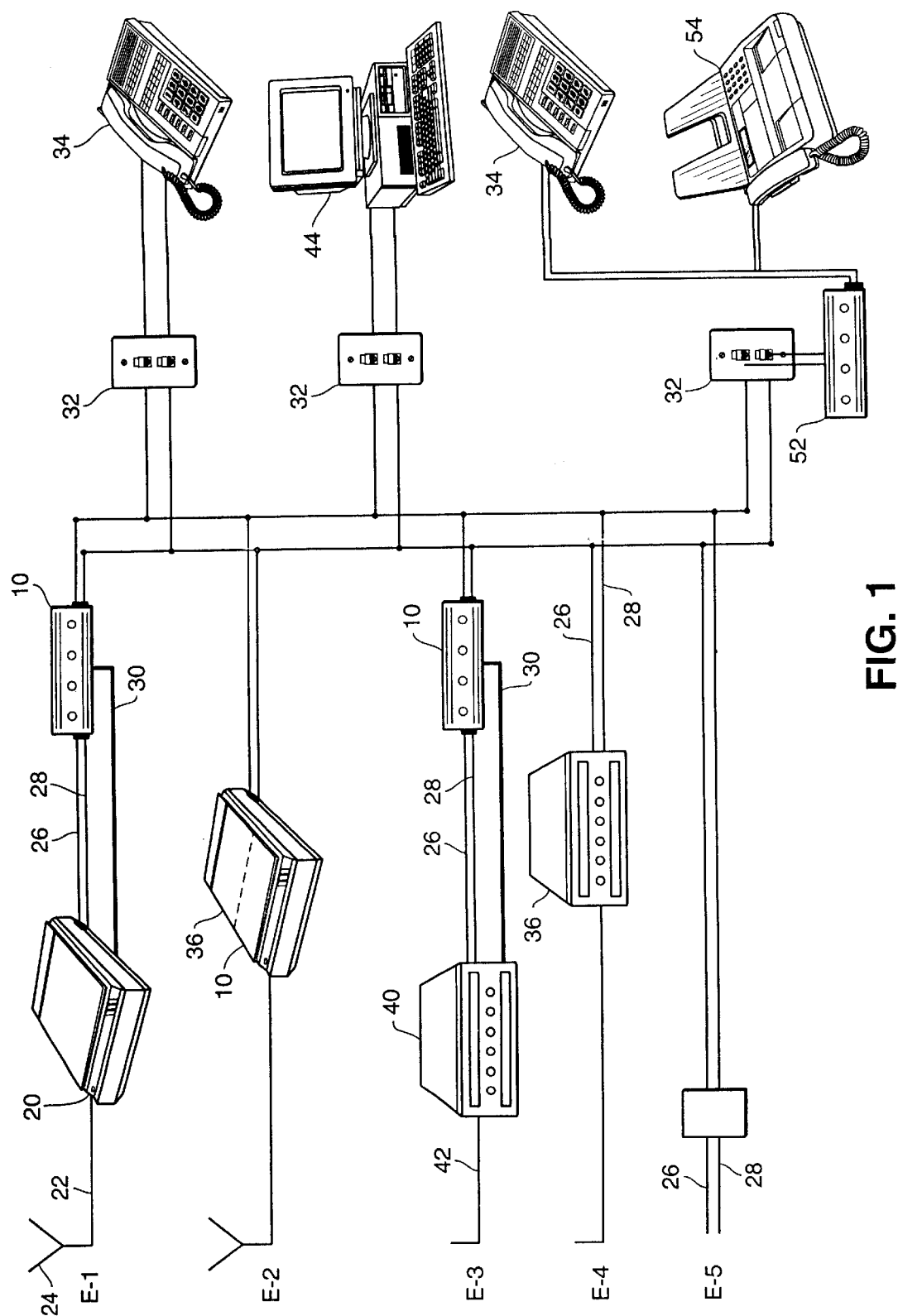
Figure 2:
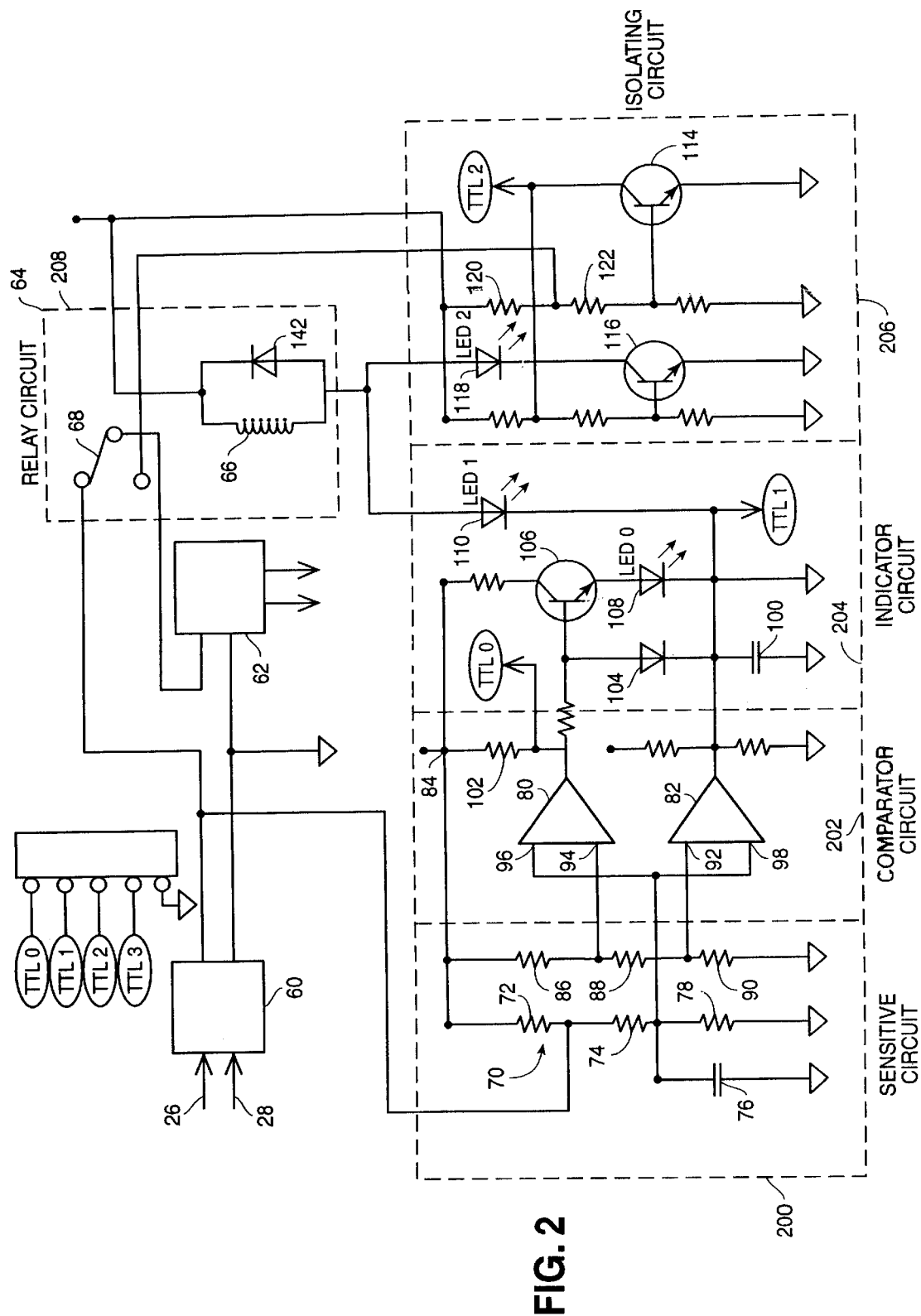
Figure 3:
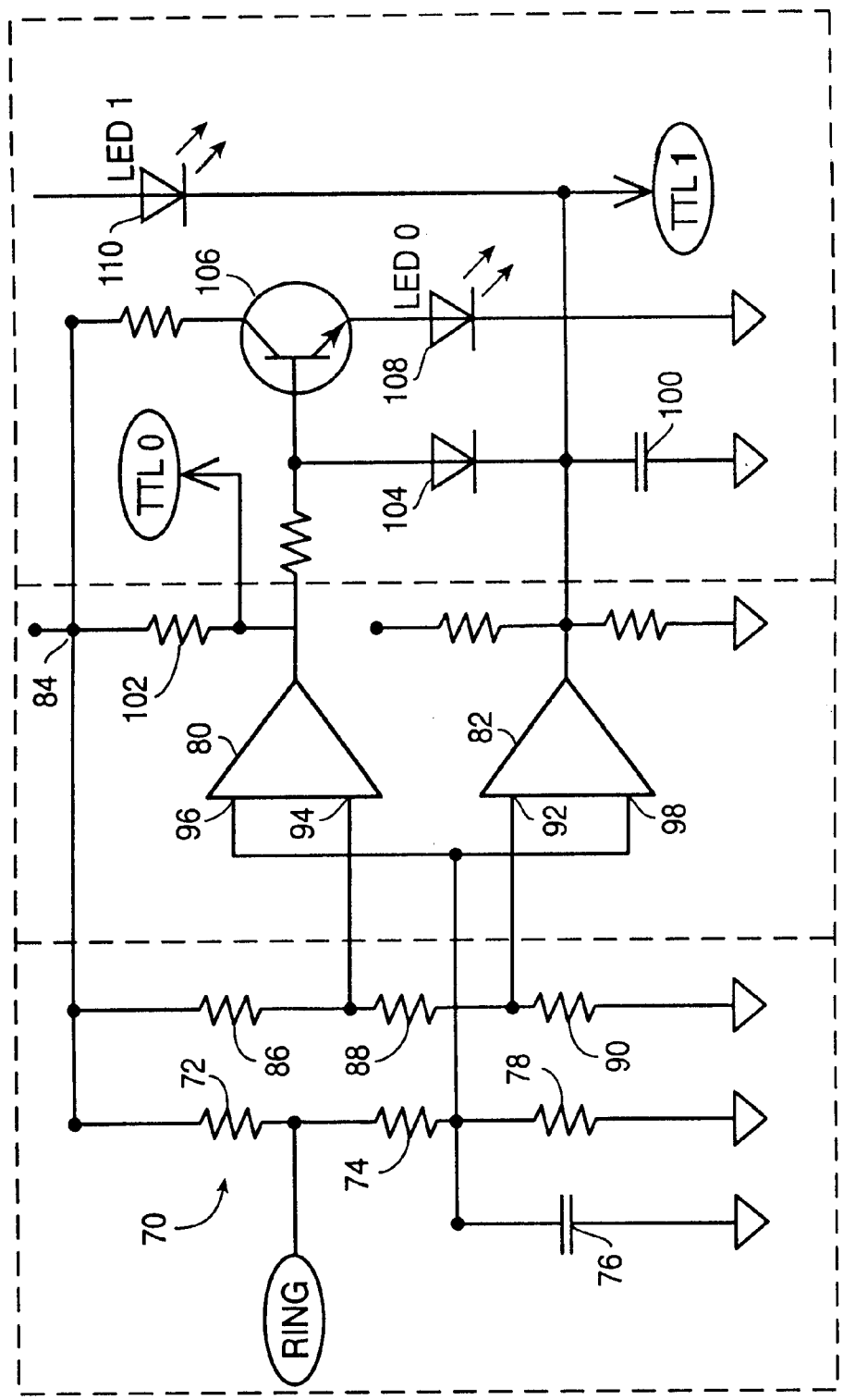
Figure 4:
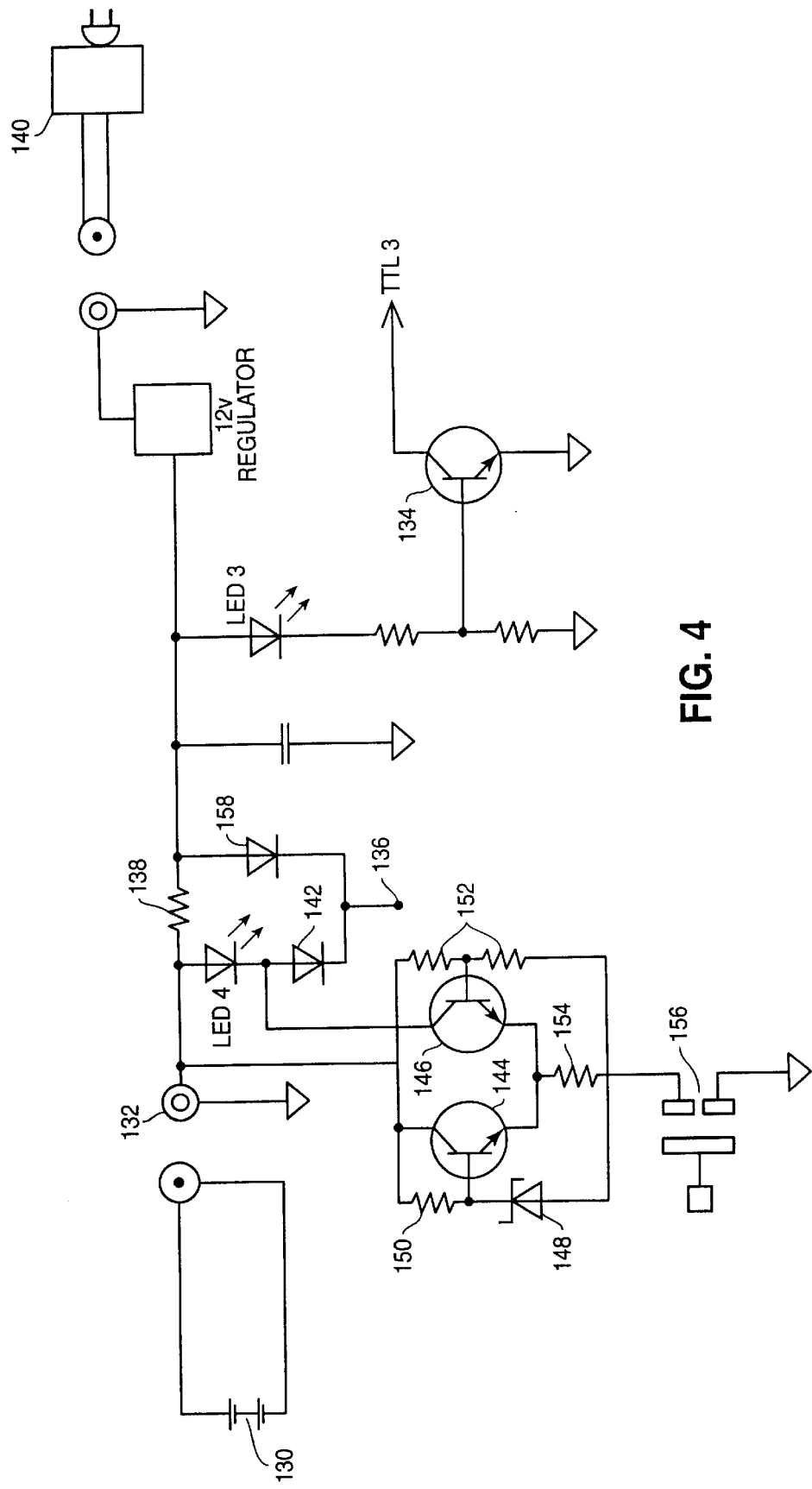
Figure 5:
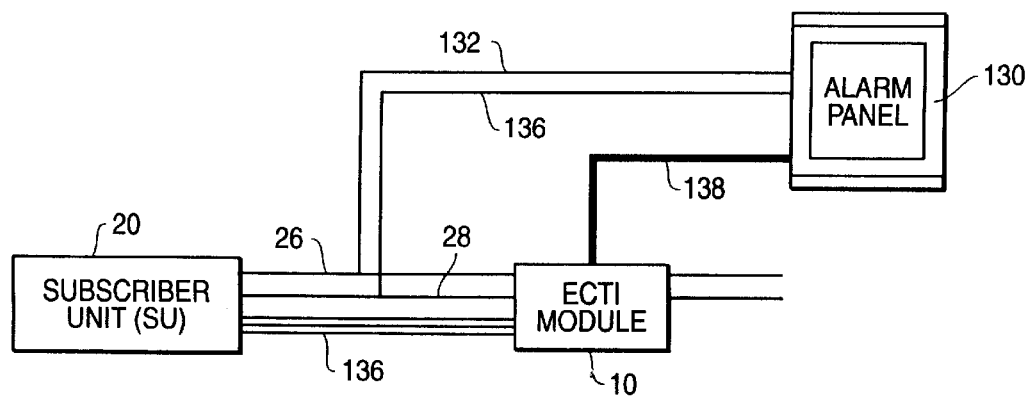
Figure 7:
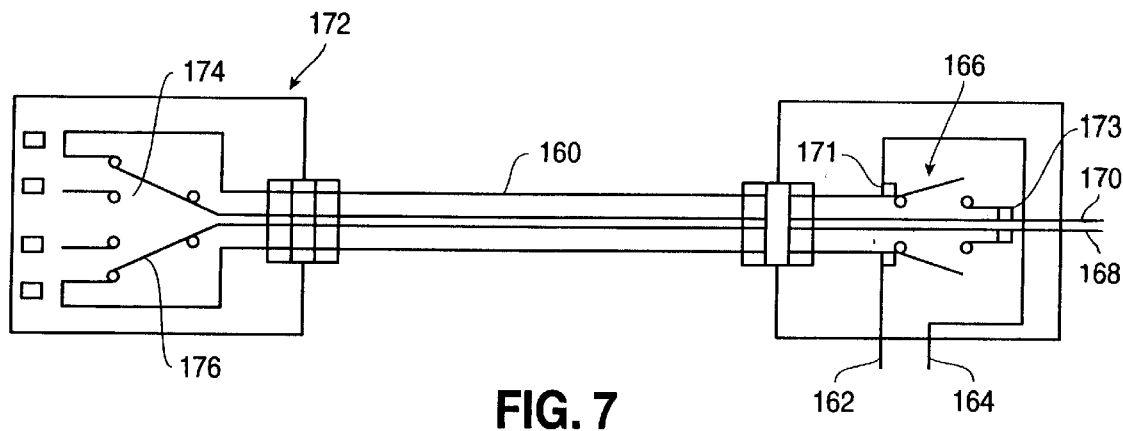
Figure 8:
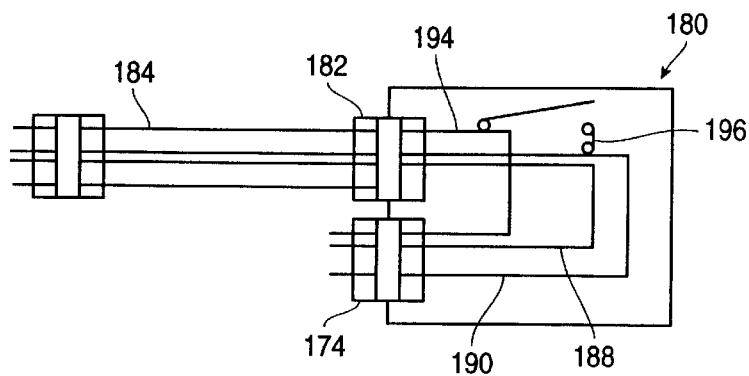
Figure 6:
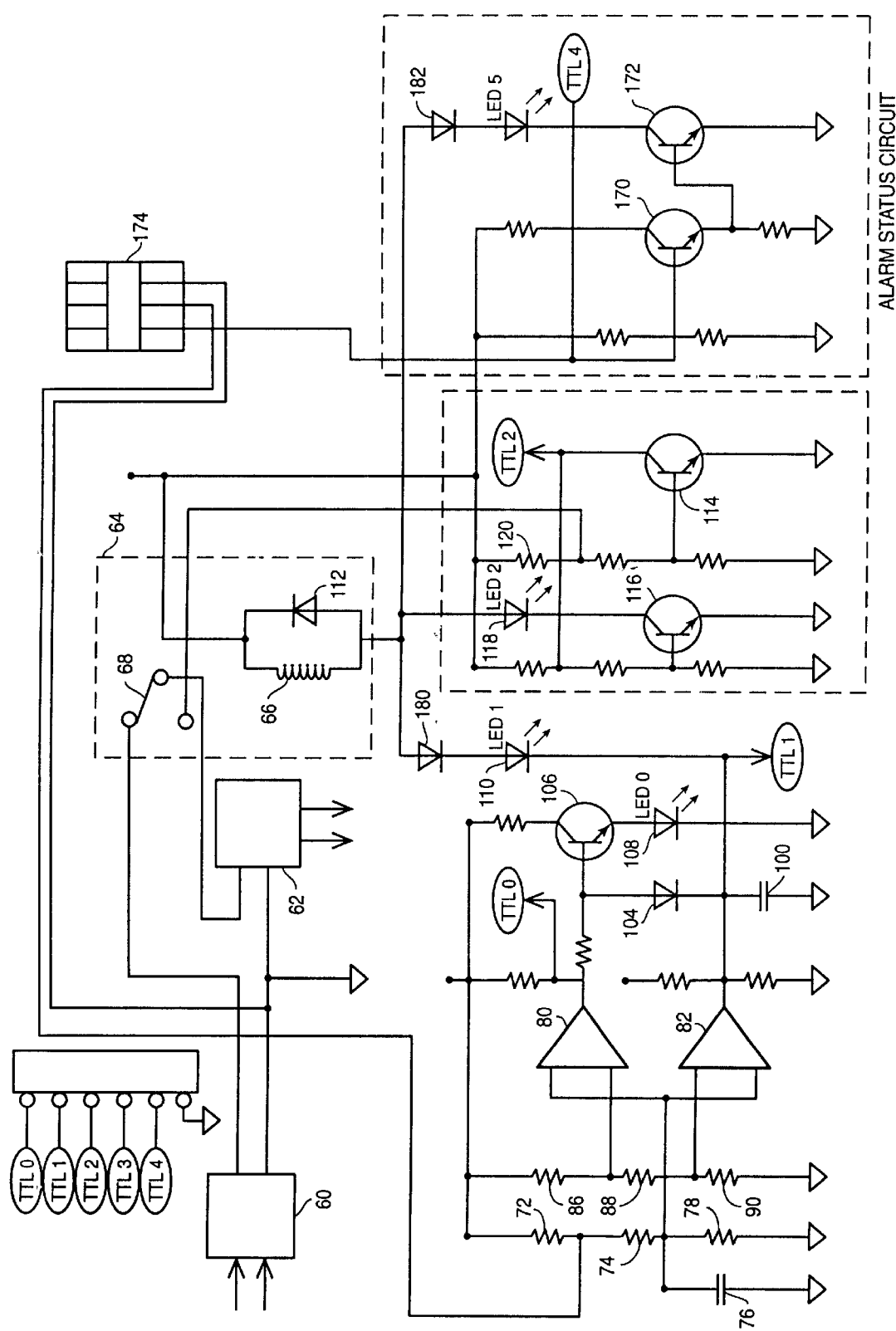

Having thus described the invention in general terms, reference will now be made to the accompanying drawings in which:

FIG. 1 is a schematic view showing various subscriber network configurations and the various optional arrangements thereof which can be used in accordance with the present invention;

FIG. 2 is a schematic electrical circuit view showing an indicator circuit in accordance with the present invention;

FIG. 3 is a schematic electrical circuit view showing a comparator portion of the circuit of FIG. 2;

FIG. 4 is a schematic electrical circuit view showing the power circuitry used in the device of the present invention;

FIG. 5 is a schematic wiring diagram showing a interfacing of an integrated monitoring and isolation unit-subscriber unit combination in accordance with the present invention, along with a conventional alarm panel;

FIG. 6 is a schematic electrical circuit diagram showing the monitoring and isolation unit of the present invention with alarm status indication forming a part thereof;

FIG. 7 is a schematic circuit diagram showing a portion of an alarm panel telephone unit interface in accordance with prior art arrangements; and FIG. 8 is a schematic electrical circuit diagram showing a combination subscriber and adapter unit for connection of the system of the invention to an alarm panel.

DETAILED DESCRIPTION OF PREFERRED EMBODIMENTS

Referring now in more detail and by reference characters to the drawings, FIG. 1 shows various arrangements in which the telephone loop monitoring and isolation device 10 of the present invention may be used. In actuality, five different optional wiring configurations can be used with the device of the present invention, as shown in FIG. 1.

In accordance with the circuit arrangement as shown in embodiment No. 1, designated as E-1, in FIG. 1, there is a wireless subscriber telephone unit 20 which interfaces to an analog or digital wireless network via antenna 24 and antenna cable 22. The subscriber unit 20 has tip and ring terminals which are respectively a ground terminal and a high voltage side terminal. Thus, in the embodiment E-1 of FIG. 1 there is a tip conductor 26 connected to the tip terminals of the subscriber unit 20 and a ring conductor 28 connected to the high voltage side terminal of the subscriber unit 20.

There is also a three pair status cable 30 connected between the subscriber unit 20 to a telephone line loop monitoring unit 10 and isolation device 10 in accordance with the present invention. In this particular embodiment, the tip and ring terminals are connected through the monitoring and isolation device 10 directly through a junction box 32 to a conventional telephone 34. In this particular embodiment, it can be observed that the monitoring and isolation device 10 is actually external to the subscriber unit 20.

As indicated previously, five individual embodiments of circuit configuration showing the use of the telephone loop monitoring and isolation device are presented. Like reference numerals will represent like components where indicated.

In the embodiment identified as E-2, in FIG. 1, there is a subscriber unit 36 which is substantially similar to the subscriber unit 20, except that it has incorporated therein the telephone loop monitoring and isolation device 10 of the present invention. In this particular case, there is no requirement for a three pair status cable 30, as was required in the embodiment E-1. Beyond this, the remaining portions of the circuit arrangement are substantially identical to those as illustrated in the embodiment E-1.

Also in accordance with an embodiment E-3 in FIG. 1, there is provided a cable interface unit 40 which receives a co-axial cable input 42. However, the tip and ring conductors 26 and 28 are also connected to corresponding tip and ring terminals of the cable unit 40, also as shown in embodiment E-3 of FIG. 1 and which are, in turn, connected to the telephone loop monitoring and isolation unit 10 of the invention. Further, the three pair status cable 30 is also used in the embodiment E-3 of FIG. 1. In the embodiment E-3, the tip and ring terminals of the monitoring and isolation unit 10 are again connected through the junction box 32, in this case to a computer 44 operable with a modem (not shown). In embodiments E-1 and E-3, it can be observed that the telephone loop monitoring and isolation device is actually operated as an adjunct to the subscriber unit. With the arrangement as shown in embodiments E-1, E-2 and E-4 of FIG. 1, there is a monitoring of the status of the loop connecting the subscriber unit to the telephone for open circuit or abnormal impedance conditions.

In the embodiment E-4 of FIG. 1, the telephone loop monitoring and isolation device 10 is incorporated directly in the co-axial cable box to provide a combined unit 50. Beyond this, the connections to the tip and ring terminals of a telephone or a modem and the connection to the co-axial cable is essentially the same. However, and here again, there is no need for a status cable 30 in this particular embodiment. The tip and ring conductors 26 and 28 may be connected through a stand-alone auxiliary monitoring and detecting unit 52, which is substantially identical to the monitoring and detecting unit 10.

This additional monitoring and isolation unit is actually a "stand-alone" monitoring unit and can provide a fault isolation to a specific subloop within the subscriber's premises in an optional arrangement. In a particular facility within a subscriber's premises, there may be a personal computer or a facsimile machine, such as a facsimile unit 54, along with or in addition to or in place of a telephone. This loop is connected to all of such equipment and therefore can be monitored.

Embodiment E-5 of FIG. 1 shows a configuration in which there is no subscriber unit involved. There is a monitoring unit, such as the monitoring unit 52, which checks the analog loop all the way back to the central office and in this case it can check the premises wiring, as well. In effect, this monitoring detecting unit 52 can be located anywhere within the loop within the subscriber's premises and in this case can be used to isolate specific apparatus in the event of a fault in the premises wiring or in the wiring to the central office. Thus, telephone service to the subscriber's premises and the subscriber's telephone loop is provided by a hard wire loop, e.g. a copper loop interface from a public switched telephone network (not shown). Thus, and in this case, the tip and ring terminals 26 and 28 would be connected to the public switched telephone network. These conductors are further connected through the junction box 32 directly to the auxiliary stand-alone monitoring and isolation device 52 and then to either a telephone 34 or a fax unit 54, or other telephone operable or communication device.

It can be seen that embodiments E-1 to E-5 are effectively mutually exclusive. The first two embodiments, E-1 and E-2, show configuration options for a wireless subscriber unit with the monitoring and isolation device both external to and internal to the subscriber unit, respectively. In embodiments E-3 and E-4 the same external and internal configurations are shown for a cable subscriber unit. In embodiment E-5, as indicated previously, there is no subscriber unit, but merely a copper loop interface. In the embodiments E-1 and E-3, the tip and ring connection between the device of the invention and the subscriber unit is monitored, as is the loop interconnecting the device of the invention and the subscriber's telephone equipment. Status information regarding the loop is passed in telephone line format via a three pair cable back to the subscriber unit. In the embodiment E-5, the tip and ring loop to the public subscriber telephone network central office is monitored as well as the loop interconnecting the subscriber unit.

In all modes of operation, the telephone loop monitoring and isolation device of the invention provides a so-called "cut-through" of the tip and ring circuit to the subscriber's telephone system. In other words, the device of the invention will maintain a complete tip and ring circuit. The monitoring of the loop by the device 10 is passive and requires no special test mode connection. Moreover, under power failure conditions, the device of the invention provides the cut-through, as indicated above, enabling complete service of the telephone network or the subscriber unit.

When it is desired to isolate a specific loop within a premise and the associated telephone circuit connected to that loop, an additional or auxiliary telephone loop monitoring and isolation device can be used, as shown in the embodiments of E-4 and E-5. The additional unit 10, as shown in embodiment E-5, demonstrates the case where a fax and a telephone can be connected on a common tip and ring pair or loop. The status of this loop can be monitored and fault isolation can be achieved supplementary to a monitoring and isolation device integrated with the subscriber unit. Thus, and in these cases, the monitoring and isolation device of the invention can be integrated into a power surge suppressor for providing power surge protection and also telephone loop status monitoring and fault isolation.

Referring now to FIG. 2, the circuit diagram for the monitoring and isolation device is illustrated in more detail. In the case of a non-stand-alone application of the telephone loop monitoring and isolation device, a power circuit of the type shown in FIG. 4 would not be required, although it may be required in the other embodiments.

Referring now to FIG. 2, a circuit diagram for the telephone loop monitoring and isolation device is shown and the power circuitry therefor is more fully illustrated in FIG. 4. There are in essence three primary sections for the interrogator portion of the monitoring and isolation device. There is provided an input node 60 which receives the tip conductor 26 and the ring conductor 28. These conductors are connected to a subscriber's premises telephone wiring node 62, as shown in FIG. 2. The ring conductor 28 is routed through a cut-through relay 64 having a coil 66 operating a switch contact 68. As depicted in FIG. 2, the relay contact 68 is shown in its normally closed position. When the switch blade of the contact 68 is in one position, current will be directly connected to the ring terminal of the node 62 and when the switch blade is in the opposite position, there will be no ring contact with the node 62. The high voltage ring signal is also introduced through a voltage divider network 70. This voltage dividing network comprises a pair of resistors 72 and 74. A capacitor such as a 0.2 microfarad capacitor 76 is connected to the resistor 74, and is provided to filter out ringing signals and transients which occur within a relatively small time constant, as for example, 0.5 seconds. In this respect, a resistor 78, which is connected to the junction of the voltage dividing network 70 and the capacitor 76 has a resistance of about 250 k-ohms.

The voltage dividing network 70, including the resistors 72, 76, 78, are all part of a sensing circuit. Also incorporated in this sensing circuit are a pair of comparators 80 and 82. Each of these comparators have an output terminal, such that the output terminal of the comparator 80 is normally "on", and when on, has a logic state of zero. On the other hand, the output of the comparator 82 is normally "off", and when off, has a logic state of one. These comparators, 80 and 82, are biased by a biasing current introduced at a node 84. Resistors 86 and 88 and 90 also bias the comparators at about ⅕ th of the voltage level applied at the node 84. Therefore, if the biasing voltage is ten volts, then an input 92 to the comparator 82 will be one volt and an input 94 to the comparator 80 will be two volts. Inasmuch as the resistors 74 and 78 are of equal ohm value, assuming there is a ring voltage of, for example, five volts or greater, then the voltage at input terminal 96 of the comparator 80 and input terminal 98 of the comparator 82 will each be about 2.5 volts.

A capacitor 100 connected to the outputs of the comparators 80 and 82 in the manner as shown in FIG. 2, will filter out ringing signals and transients. This capacitor has a value of 0.2 microfarads and will, therefore, filter with a time constant of approximately one second inasmuch as the resistor 78 has a value of about 5 mega-ohms.

Normal biasing of the sensing circuit will result when there is neither a short nor an open circuit from the loop monitoring and isolation device 10 back to the subscriber unit, e.g., the subscriber unit 20. As a result, the comparator 82 is biased off and the output of that comparator 82 is approximately 6.0 volts. With normal biasing, the comparator 82 will be "on" and a resistor 102 connected to the output of the comparator 80 and the biasing voltage node 84 will be at a ground voltage level. Inasmuch as the comparator 82 is off with approximately a 6 volts input, a diode 104 connected to the output of the comparator 80 will be biased off. The diode 104 is connected to the output of the comparator 80, and is reversely biased as a result of the comparator 80 being biased off. Further, an NPN transistor 106 is connected to the output of the comparator 80, and since the diode 104 is reverse biased, the base of the transistor 106 will be at a zero level. Therefore, the transistor 106 will be non-conducting.

The transistor 106 operates as a driver which will turn on a light emitting diode 108, also identified as LED-0, and which, in turn, functions as an indicating light when there is an open circuit condition from the loop monitoring and isolation device 10 back to the subscriber unit 20. Referring particularly to FIG. 3, it can be seen that when the ring voltage is shorted to ground, the comparator 82 will be turned on, and the output of comparator 82 will be at a ground potential. The comparator 80 will be then turned of f resulting in an output of this comparator 80 of a potential of less than 5 volts. These output voltages will drive a TTL-0 output to a logic level "1", and a TTL-1 output to a logic level of 0. The base of the transistor 106 will be reverse biased and thus the transistor 106 will not conduct. As a result, the light-emitting diode 108 will not be energized. Due to the fact that TTL-1 is at a logic level zero, a light-emitting diode 110 or LED-1, connected to the output of the comparator 82, will be energized.

It should be recognized that in addition to the sensing circuit described herein, the diode 104, the capacitor 100 and the diode 108, along with the transistor 106 function as an indicator circuit for operation of an indicator such as the light-emitting diode 108, as well as the light-emitting diode 110 or LED-1. A summary of the comparator states for the comparators 80 and 82 is set forth below in the following Table I:

TABLE I

| | Comparator 80 | | |
|---|---|---|---|
| Loop State | Terminal 94(+) | Terminal 96(−) | TTL-0 |
| Normal Tip-Ring Loop conditions | 2 volts | 2.5 volts | "0" |
| Tip-Ring Open Circuit | 2 volts | 1.7 volts | "1" |
| Ring short or abnormal impedance | 2 volts | 0 volts | "1" |

TABLE I-continued

| | Comparator 82 | | |
|---|---|---|---|
| Loop State | Terminal 98(+) | Terminal 92(−) | TTL1 |
| Normal Tip-Ring Loop conditions | 2.5 volts | 1 volt | "1" |
| Tip-Ring Open Circuit | 1.7 volts | 1 volt | "1" |
| Ring short or abnormal impedance | 0 volts | 1 volt | "0" |

This Table I shows the outputs for non-normal tip-ring loop conditions, and tip-ring open circuit and a ring short, or other abnormal impedance. Further, for Table 1, the voltage at the biasing node 84 is deemed to be 10 volts D.C.

The description of the circuit thus far relates to the function of the sensing circuit and the indicator circuit under normal conditions.

The following is a description of the sensing circuit and the indicator circuit under abnormal conditions and the effect of the disconnect/cut-through relay circuitry. An open circuit between the telephone loop monitoring and isolation device 10 and the subscriber unit 20, or the telephone network is considered. When no voltage is applied to the input at the ring-tip connection, the voltage at the junction between the resistors 74 and 78 drops to about 1.7 volts (5 M-Ohms to 30 M-Ohms). This will cause the input terminal 96 of the comparator 80 to be driven at to potential of less than 2 volts and, hence, less than the potential of the terminal 94 of the comparator 80. As a result, the output of the comparator 80 will rise to approximately 5 volts and this will turn on the transistor 106. When the transistor 106 is conducting, the light-emitting diode 108 will turn on and the TTL-0 output will be at a logic level of "1" indicating an open-circuit condition. The comparator 82 will remain off in the normal state and the TTL-1 output will indicate a logic level state of "1".

The relay circuit as shown in FIG. 2 isolates the circuit portion in which it detects a short circuit. This can be the entire premises telephone circuit or as shown in FIG. 1, or a part of the circuit where monitoring and isolation may be desired. As also hereinafter described, in connection with the use of an alarm system, the relay can also provide isolation when an alarm is detected.

The following is a description of the operation of the circuit when there is a short on the line between the telephone loop monitoring device 10 and the subscriber unit, or the telephone network. In this case, when the tip and ring pair of conductors, such as the conductors 26 and 28 are shorted between the monitoring and isolation unit 10 and the network or subscriber unit 20, the voltage at the junction between the resistors 74 and 20 drops to zero and, as a result, the output of the comparator 82 also drops to zero. This will turn on the first light-emitting diode 108 or LED-1. The output of the comparator 82 also causes the light-emitting diode 110 or LED-2 to conduct, which thereby turns off the base of the transistor 108 and also turns off the light-emitting diode 108. Inasmuch as the output of the comparator 82 is also at the same level as the TTL-1 output line, a logic level "0" for a shorted network is indicated.

When comparator 82 is reduced to a zero level, the current flowing through the relay coil, such as the relay coil 66, opens the "cut-through" relay contacts 68. A diode 142 is also connected across the relay coil 66 in order to clamp any transient voltage spike when the relay coil 66 turns off.

Another transistor 114, as also shown in FIG. 2, will remain in a conducting state so that the output TTL-2, equals a logic level "0". A collector of a transistor 116 is connected to the relay coil 66 which will be non-conducting. As a result, a light-emitting diode 118, often designated as LED-2, will be de-energized. When the short condition is removed, the relay coil 66 will automatically return to its normally closed state.

The following is a description of the operation of the circuit where a short or abnormal loop impedance occurs on the loop between the monitoring unit of the invention and the subscriber's telephone apparatus. A short on the subscriber line such as, for example, the line 22, will appear to the comparators, such as the comparators 80 and 82, as does a short on the network since the cut-through relay contacts 68 are in the normally closed position. Therefore, momentarily the light-emitting diode 110 or LED-1 and the relay coil 66, will be activated. However, the moment the relay opens, the network side of the unit returns to a normal state and the short condition is applied to the junction of a pair of resistors, 120 and 122. This will cause the transistor 114 to turn off, and the transistor 116 to turn on. As a result, this will shift the relay current path through the transistor 116 and the light-emitting diode 118 or LED-2 will turn on. The opened cut-through relay, such as the relay 66, protects the network and will remain open until the shorted or abnormal impedance has been removed and the line returns to a normal state. At this point, the circuitry automatically restores the cut-through relay coil 66 to its normally closed-state.

There are no latch conditions for any of the faults described herein. If there is no power applied to the monitoring and isolation unit 10, the cut-through relay cannot be activated from its normally closed state, and the unit 10 will not impair normal telephone use.

Four TTL status signals are available to a subscriber unit, such as the subscriber unit 20, with a TTL interface. The states of the TTL signals and the corresponding light-emitting diodes for the various line conditions thus described, are shown in the following Table II, as set forth below:

In an open ring circuit condition, the light emitting diode LED-0 is on, the TTL-0 output is "1" or a positive. The LED-1 light emitting diode is off and the TTL-1 logic level output is positive. If there is a short in the line, the relay circuit 64 operates in conjunction with the isolation circuit 206, as hereinafter defined. In this case, when the coil 66 is energized, and there is a short or an open line condition, the relay will prevent the de-energization of the remainder of the telephone line. The short actually causes the relay to change status and open the line condition in order to protect the telephone circuit. In essence, when there is a problem in the telephone line, the relay coil 66 causes the switch 68 to operate so that, in effect, the circuit is detecting a short created by the relay. This, however, is representative of a short in the telephone circuit itself.

The transistors 114 and 116 effectively cause the relay to operate. In effect, the transistors and the relay restore the line to its original condition after the fault condition has been removed.

FIG. 4 more fully illustrates the power circuitry which may be used with the monitoring and isolation unit. In the case of a non-stand alone application of the monitoring and isolation unit, the power circuit would not be required and the device would be powered through the subscriber unit 20. However, where those conditions do not exist, the power circuitry may be needed.

The power circuitry for the monitoring and isolation unit 10 is, as indicated, more fully illustrated in FIG. 4 and will usually include a stored source of electrical power including, for example, a twelve volt battery 130. This battery 130 may be connected across a battery terminal or so-called "input jack" 132 which receives the full twelve volts of the battery. The typical wall transformer with poor regulation usually operates at about 18 to 20 volts when only lightly loaded. The monitoring and isolation unit 10 of the present invention, draws only about 15 to about 20 milliamperes and, therefore, a regulator to 12 volts D.C. is required to assume proper operation.

When power is applied through the input jack 132, a green light-emitting diode 133, often designated as LED-3, will be

TABLE II

| Line Condition: | LED0 | TTL0 | LED1 | TTL1 | LED2 | TTL2 | LED3 | TTL3 | LED4 |
|---|---|---|---|---|---|---|---|---|---|
| External Power On & Normal condition | Off | 0 | Off | 1 | Off | 0 | On | 0 | Off |
| Battery backup* & normal condition | Off | 0 | Off | 1 | Off | 0 | Off | 1 | On |
| Short Network** | Off | 1 | On | 0 | Off | 0 | On | 0 | As above |
| Open Network | On | 1 | Off | 1 | Off | 0 | On | 0 | As above |
| Short Subscriber | Off | 0 | Off | 1 | On | 1 | On | 0 | As above |

The conditions for Table II will remain as identified above, unless battery voltage supplying the circuit arrangement falls below 10 volts D.C. Also, any short circuit or abnormal loop impedance conditions which pull the tip-ring voltage below 5 volts D.C. will result in those conditions specified in Table II.

Under these conditions, if the normal tip-ring voltage is greater than 5 volts, both light-emitting diodes LED-0 and LED-1 are off, the transistor logic level output TTL-1 is "1" and the transistor logic level output TTL-2 is "0". If there is a short such that the input voltage is less than 5, but more than 0, then the ring is open. The TTL-1 output is between 2.2 volts to 5 volts, the logic level is between 0 to 0.82 volts. Thus, the output of the comparator 80 is + and the output of the comparator 82 is 0. As a result, the light emitting diode LED-0 is on.

turned on and the power through this light-emitting diode 133 will turn on a transistor 134. The collector of the transistor 134, which provides a TTL-3 output, will either be at a high impedance such that TTL is a logic level 1, indicating to a subscriber unit with TTL sensing that power is not being applied to the monitoring and isolation unit. Thus, the green light-emitting diode 133 or LED-3 will be off. The transistor 134 will be of low impedance and the TTL-3 output signal indicates a logic level of "0". The green LED 133 or LED-3 will then be lighted. In a non-powerfail situation, the voltage at an output 136, identified as a Vcc output, will be approximately 11.4. Further, a trickle-charged circuit path to the rechargeable twelve volt battery 130, is provided through a resistor 138.

When a one hundred ten volt A.C. power source, such as that supplied from a wall mounted transformer 140 is disconnected or interrupted, the Vcc voltage, such as at the voltage output 136, is provided from the twelve volt battery source. In this case, the voltage Vcc will be approximately ten volts allowing for the voltage drop across a light-emitting diode 137, often referred to as the light-emitting diode LED-4, and a normally biasing diode 142. The light-emitting diode 137 will be energized when the monitoring and isolation unit module is on battery back-up powering, and the light-emitting diode 133 or LED-3 will turn off. A TTL-3 logic level will indicate to the subscriber unit 20 that the monitoring and isolation unit is on back-up power.

In accordance with the further construction as illustrated in FIG. 4, the light-emitting diode LED-4 and the normal biasing diode 142 operate in conjunction with a pair of transistors 144 and 146, as also shown in FIG. 4. A zener diode 148 is connected to the collector of the transistor 144, along with a 2 k-ohm resistor 150.

A pair of dividing resistors 152 are connected across the collector of the transistor 146, as shown. The output of the emitters of each of these transistors is connected through a resistor 154 to a test switch 156, also as best shown in FIG. 4. This test switch provides a means of checking the D.C. power level. If that battery level is less than ten volts, that light-emitting diode LED-4 will not turn on.

It is to be noted that light-emitting diode LED-4 will turn on when power is used or when the test switch is actually closed. If the battery voltage is less than ten volts, the light-emitting diode LED-4 will not turn on. The diode 142, along with another diode 158, serve to isolate the external voltage from the battery.

By further reference to FIG. 2, it can be seen that the entire circuit is actually divided into a sensing circuit 200, comprised primarily of the voltage dividing network 70, and the resistors 86, 88 and 90, along with capacitor 76. Connected to the output of the sensing circuit 200 is a comparator circuit 202, which is primarily comprised of the comparators 80 and 82, along with the resistor 102 and the resistors at the output of the comparator 82. Connected to the comparator circuit, is an indicator circuit 204 which includes, for example, the transistor 106, along with the capacitor 100.

As indicated previously, the present invention is effective to actually isolate the subscriber premises circuit if required and, thus, an isolation circuit which primarily is comprised of the transistors 116 and 114 is provided. This circuit also includes the diode 118 for biasing the emitter of the transistor 116, and the voltage dividing network comprised of the resistors 120 and 122. The isolation circuit 206 works in conjunction with a relay circuit 208, which is primarily comprised of the relay 66, the diode 102 and the switch 68.

It should also be observed that a telephone connected between the subscriber unit and the monitoring unit, as for example, in FIG. 1 will allow service even if the monitoring unit has detected and isolated a short circuit in the subscriber's premises.

It can be observed by reference to FIG. 2 that there are essentially three light emitting diodes or other indicators. In this case, the light emitting diode 108 or LED-0, is an open circuit indicator. The light emitting diode 110 or LED-1, functions as a network short-circuit indicator and the light emitting diode 118 or LED-2, operates as a subscriber loop short circuit indicator.

The various transistor outputs, such as TTL-0, TTL-1 all function as transistor logic level outputs. These outputs are adapted for connection to the subscriber unit for, and in particular, over the three pair TTL status cable 30. The subscriber unit could be modified to receive all of these transistor logic level outputs to provide some type of responsive action. Otherwise, the monitoring and isolation unit of the present invention is an effective stand alone unit and does not require connection to the subscriber unit through the TTL logic conductors 30.

By further examining the comparator circuit 202, it can be observed that there are essentially four states for the comparator block comprised of the comparators 80 and 82. Thus, each light emitting diode may be on or off, which constitutes two states and the two light emitting diodes thereby represents four individual states.

It can be observed by design that the voltage level at the point of connection of the two resistors, 72 and 74 is about 1.5 volts. The voltage is 2.5 or greater under normal conditions. The supply voltage could initially be ten volts or, for that matter, a supply voltage of less than that amount. Nevertheless, both light emitting diode 110 or LED-1 and diode 118 or LED-2 are off when conditions are normal and the ring voltage is greater than five volts.

As indicated previously, the system of the invention is capable of also providing alarm interface and status reporting. Thus, the system is designed to be compatible with existing alarm panels. Conventional monitored alarms usually employ a RJ-45 and a RJ-31 patch cable in the manner, such as that patch cable 160, as best shown in FIG. 7 and which usually spans the connection from the typical traditional telephone tip-ring telephone network, such as those terminals 162 and 164 also identified in FIG. 7. When a jack for connection of the alarm system is used, and is inserted into a jack receptacle for that purpose, a pair of contacts 166 will open, as shown in FIG. 7. This system may thereupon isolate the premises telephone and gives an alarm panel control over the tip terminal 164 and the ring terminal 162. The premises tip-ring terminals of the subscriber unit is routed via the alarm panel. If the alarm relay trips, the premises will then be isolated.

A conventional subscriber unit will typically be subscriber installable with an RJ-11 interface to their premises telephone wiring. While necessarily convenient for a wireless operator, a problem arises from alarm reporting in that all premises telephones on the same line as the subscriber unit are connected in parallel with the alarm. In this way, a premises intruder can, therefore, block an alarm call to a monitoring station by establishing a telephone call from any premise telephone.

Providing a direct connection with the subscriber unit and the alarm system does not solve any problem because the premises telephone system must be isolated to allow alarm priority connection to the tip and ring terminals, 164 and 162, respectively.

In like manner, for a cable network interconnection, the best location will be at an existing cable jack. In both cases, the subscriber unit location will not necessarily be close to an alarm panel on the premises.

Tip and ring voltages will be provided at terminals 168 and 169, in FIG. 7. The alarm panel arrangement 172, containing switches 174 and 176 in FIG. 7, is essentially conventional and is not described in any further detail herein. In accordance with this construction, when the alarm panel is connected and activated, it can control the tip-ring terminal voltages. This operates for a wireless network where the terminals 168 and 170 are the entry point of the tip-ring terminals to the premises. However, this arrangement is not necessarily convenient for a wireless network.

FIG. 5 illustrates an embodiment of the invention in which there is an alarm interface as well as a status reporting the capability of the monitoring and isolation unit 10 in the event of rat an alarm. In connection with the embodiment of FIG. 5, like reference numerals will be used to represent like components in the previously described embodiment.

Since the monitoring and isolation unit 10 of the invention can also be used for interfacing with existing premises alarm systems in the manner as shown in FIG. 5, this particular configuration as set forth in FIG. 5, is therefore compatible with existing alarm systems. The enhancement of such alarm systems is provided for those networks which support a signaling channel between the subscriber unit and the telephone network, as for example, in the case of the PCS Wireless Networks and the proposed telephone cable access systems. In this particular case, it can be observed that a subscriber unit 20 is connected directly to an alarm panel 130 of conventional construction through an auxiliary ring conductor 132 and an auxiliary tip conductor which are connected directly to the tip and ring conductors 26 and 28. In this particular embodiment, the tip and ring conductors extend through the monitor and isolation device 10, as for example, in the embodiment of figure E-1 of FIG. 1. However, in order to provide for an alarm premises enhancement, a TTL status link 136 is provided between the subscriber unit 20 and the monitoring and isolation unit 10. Further, an alarm status signaling line 138 is provided between the monitoring and isolation unit 10, and the alarm panel 130, all as best shown in FIG. 5.

It is to be recognized that even with the embodiment of FIG. 5, the subscriber unit and the monitoring and isolation unit could also be integrated as a single circuit arrangement, as described in the embodiments E(2) and E(4) of FIG. 1. It should also be recognized that the tip-ring connection is optional in that the alarm status is constantly monitored and transmitted to the transcriber unit 20 via the TTL interface link 136. Further, a status signal from the alarm panel to the monitoring and isolation unit 10 may also be communicated with a radio interface, thereby eliminating the need for a hard-wire connection.

When a subscriber unit or cable interface is used to replace the traditional tip-ring connection to the subscriber's premises, the typical alarm panel output must be re-rooted to the subscriber unit. If any alarm should occur with an existing alarm system, it is necessary to isolate the premises telephone wiring from the tip-ring circuit of the alarm so that the alarm has a priority in a communication path to the telephone network. If such is not achieved, a call from the premises telephone will "busy out" the loop to the telephone central office. This would block an alarm call to a monitoring center. The monitoring and isolation unit of the present invention provides the required isolation. The unit of the invention functions to provide an alarm status indication via the subscriber unit to a monitoring service center or wireless network operator. When using a wireless or cable access to a telephone network, a signaling path can be maintained along with a voice or a data telephone call. The unit of the invention provides the capability of communicating the alarm status information even during an existing active telephone call from the premises. A monitoring and isolation system of the invention takes advantage of this signaling path to the telephone network and by delivering the alarm status through the TTL input to the subscriber unit.

FIG. 6 illustrates the complete circuit diagram for both the monitoring and isolation system, along with an alarm interface. In this case, many of the components and much of the circuit arrangement of FIG. 6 is similar to that of FIG. 2. In the circuit of FIG. 6, additional NPN transistors 177 and 179 are also employed, along with an alarm status indicator in the nature of a light-emitting diode 183, also designated as LED-5. Further, a jack 186 is also provided, as shown in FIGS. 6 and 8, in order to obtain an interface between the monitoring and isolation unit 10, along with an alarm system.

When the alarm is not activated, the base of the transistor 170 is at ground potential. This forces the transistor 170 into the non-conducting state. The TTL-4 output will be in the "0"logic level state indicating there is no set alarm condition. In like manner, the transistor 172 will also be turned off.

Referring again to FIGS. 7 and 8, when the alarm is activated, the patch cable 184, as hereafter described is no longer held at the ground potential as the alarm contacts 174 and 176 open. With the voltage Vcc of the monitoring and isolation unit 10 at ten volts, the base of the transistor 177 will be at 5.5 volts (D.C.) and in this case, the transistor 177 will be in the conducting state. In like manner, the potential of TTL-4 output will be at 5.5 volts, indicating a logic level of "1" condition which is an alarm status indication. The emitter of the transistor 177 will be at approximately 4.7 volts and will force transistor 179 into the conducting state. As this occurs, the light-emitting diode LED-5 will provide a visual alarm indication.

When in the conducting state, the transistor 179 will also force the activation of the monitoring and isolation relay coil 66. Diodes 180 and 182, which are positioned to prevent reverse bias of current at the TTL-1 output and the TTL-4 output respectively, will ask as an "OR" circuit for the relay. Either a subscriber short circuit condition or an alarm condition will turn on the relay coil 66. When activated by the alarm panel, the relay coil 66 will stay in the activated state until the alarm turns off. Therefore, when the relay coil 66 is activated, the subscriber premises telephone system is isolated and no longer connected to the subscriber unit tip-ring voltage. Thus, the alarm panel is given a priority access to the tip-ring voltages under alarm conditions.

In FIG. 8 reference numeral 180 represents an alarm patch panel interface module containing jacks 182 and 186. This interface module will be located in close proximity to the alarm panel. The patch cable 184 interfaces into the alarm panel interface module 172 shown in FIG. 7. In FIG. 8, the ring connection block it 180 and the tip terminal is designated as 190. With no alarm state activated, a relay alarm contact shown as 174 in FIG. 7, will hold the alarm status link to the monitoring and isolation module line 194 at tip potential (ground). When an alarm is indicated, the alarm relay contacts 174 and. 176 close and the line 194 will no longer be clamped to ground. Line 194 will be pulled-up to the base potential of transistor 177 as shown in FIG. 6.

In the event there is no alarm panel connection, the pins on the jack 186 for the conductors 190 and 194 serving respectively as tip and ring terminals, would be shorted and, in this case, the transistors 177 and 179 (hereinafter described in more detail and with reference being made to FIG. 6), would be in the off state. The TTL-4 output would have a zero logic level state, that is, no alarm activation. Since the monitoring and isolation unit of the invention provides an alarm status indication to the subscriber unit, even though it is not necessarily a requirement for a tip-ring interface. A ground connection is provided in place of the connection for the tip terminal 190.

It is also possible to use an alternate connection in FIG. 8 in which the contacts 196 are opened when a jack is inserted into the jack receptacle. A signaling pair would be directly connected to a subscriber unit to carry not just the status of the alarm, such as an on condition or an off condition, but also the zone from which the detected alarm originated on the subscriber's premises, that is, the possible point of entry into the premises such as a door or window. The subscriber unit would then be alerted to an alarm condition through the TTL-4 output and would read the alarm signaling pair for the necessary alarm information.

Pins on the jack 186 for the conductors 190 and 194, can also be used as a switching circuit to activate a radio transmitter. This transmitter can be used to control the base of the transistor 170. Simple replacement of this wiring connection between the monitoring and isolation unit of the invention and the subscriber unit adapter 180 of FIG. 8 will remove the need for any wired connection between the monitoring and isolation and the alarm system.

Thus, there has been illustrated and described a unique and novel telephone loop monitoring and isolation system and a method of monitoring and isolating a subscriber loop. The system and method thereby fulfills all of the objects and advantages which have been sought therefor. It should be understood that many changes, modifications, variations and other uses and applications will become apparent to those skilled in the art after considering this specification and the accompanying drawings. Therefore, any and all such changes, modifications, variations and other uses and applications which do not depart form the spirit and scope of the invention are deemed to be covered by the invention.

Having thus described our invention, what we desire to claim and secure by Letters Patent is:

1. An arrangement for monitoring a premises telephone circuit connected in parallel with an external telephone network, and isolating the premises circuit from the external telephone network upon determining that a fault exists with either the premises circuit or the external network, said arrangement comprising:
    a sensing circuit operatively interposed between the premises circuit and the external telephone network that monitors a tip and ring voltage level on the premises circuit and the parallel external telephone network;
    an isolation circuit connected to the sensing circuit that disconnects the premises circuit from the external telephone network if the sensing circuit senses that the monitored tip and ring voltage level is outside of a predefined voltage range;
    a comparator circuit that separately tests the external telephone network and the premises circuit following disconnection of the premises circuit, to determine whether the fault exists with the external telephone network or the premises circuit, said comparator circuit including:
        means for injecting a voltage onto the premises circuit following disconnection of the premises circuit from the external telephone network;
        means for measuring an impedance level on the disconnected premises circuit resulting from the injected voltage; and
        means for determining that the fault exists with the premises circuit if the measured impedance level is outside of a predefined impedance range; and
    means connected to the sensing circuit for automatically reconnecting the premises circuit to the external telephone network if the sensing circuit senses that the tip and ring voltage level on the premises circuit and the parallel external telephone network has returned to the predefined voltage range.

2. The arrangement of claim 1, further comprising a testing circuit that, after the premises circuit is disconnected from the external telephone circuit, enables an operator of the external telephone circuit to determine whether the external telephone network is functioning normally outside the premises circuit.

3. The arrangement of claim 1, wherein the isolation circuit includes a connection to a premises security alarm system that provides the premises security alarm system with access to the external telephone network even when the premises circuit has been disconnected by the isolation circuit.

4. The arrangement of claim 1, wherein the external network is a wireless network connected to the arrangement through a wireless subscriber unit that includes tip and ring connectors that connect to the sensing circuit, and the sensing circuit measures the tip and ring voltage level of the tip and ring connectors of the wireless subscriber unit together with the impedance level of the premises circuit.

5. In a premises telephone circuit having a plurality of parallel branches upon each of which an individual communication unit is connected, an arrangement for monitoring operating conditions on one of said parallel branches, and upon detecting a fault on the monitored branch, isolating the monitored branch from the premises telephone circuit and from an external telephone network, said arrangement comprising:
    a sensing circuit connected to the monitored branch of the premises telephone circuit, said sensing circuit being operative to detect the fault with the monitored branch; and
    an isolation circuit connected to the sensing circuit that disconnects the monitored branch from the premises circuit when the sensing circuit detects the fault, said isolation circuit sustaining normal operating conditions on the disconnected monitored branch so that the remaining parallel branches of the premises telephone circuit remain operational after the disconnected monitored branch is disconnected.

6. The arrangement of claim 5, wherein the sensing circuit includes means for detecting whenever any operating condition on the monitored branch is outside of a predefined range, said operating condition being selected from a group consisting of:
    tip and ring voltage level;
    impedance level; and
    difference in impedance level between the premises circuit and the external network.

7. The arrangement of claim 6, wherein the sensing circuit continues to monitor operating conditions on the monitored branch after the isolation circuit disconnects the monitored branch from the premises circuit, and upon detecting that the monitored branch is operating normally, the sensing circuit signals the isolation circuit to automatically reconnect the disconnected monitored branch to the premises circuit.

8. A system for controlling interaction between an external telephone network and a premises telephone circuit having a plurality of parallel branches for connecting a plurality of individual communication units, said system comprising:
    a premises monitoring device operatively interposed between the premises circuit and the external telephone network, said premises monitoring device including:
        a premises/network sensing circuit that simultaneously monitors operating conditions for both the premises circuit and the external telephone network;
        a premises isolation circuit connected to the premises/network sensing circuit that disconnects the premises circuit from the external telephone network if the premises/network sensing circuit senses a fault with the premises circuit or the external telephone network;

a comparator circuit that separately tests the premises circuit and the external telephone network to determine whether the fault is with the premises circuit or the external telephone network; and means connected to the premises/network sensing circuit for automatically reconnecting the premises circuit to the external telephone network if the premises/network sensing circuit senses that the premises circuit and the external telephone network are operating normally; and a plurality of branch monitoring devices, each of said branch monitoring devices being connected to and monitoring conditions on a different parallel branch of the premises circuit, each of said branch monitoring devices including:

a branch sensing circuit operative to detect a fault with the monitored branch; and a branch isolation circuit connected to the branch sensing circuit that disconnects the monitored branch from the premises circuit when the branch sensing circuit detects the branch fault, and sustains normal operating conditions on the disconnected monitored branch so that the remaining parallel branches of the premises telephone circuit remain operational after the disconnected monitored branch is disconnected.

9. The system of claim 8, wherein the branch sensing circuit continues to monitor operating conditions on the disconnected monitored branch after the isolation circuit disconnects the monitored branch, and upon detecting that the monitored branch is operating normally, the branch sensing circuit signals the branch isolation circuit to automatically reconnect the monitored branch to the premises circuit.

10. A method of controlling interaction between an external telephone network and a premises telephone circuit, wherein the premises circuit has a plurality of parallel branches for connecting a plurality of individual communication units, the method comprising the steps of:

simultaneously monitoring operating conditions for both the premises circuit and the external telephone network;

disconnecting the premises circuit from the external telephone network if the premises/network sensing circuit senses a fault with the premises circuit or the external telephone network;

separately testing the premises circuit and the external telephone network to determine whether the fault is with the premises circuit or the external telephone network;

continuing to monitor operating conditions for both the premises circuit and the external telephone network after the premises circuit is disconnected from the external telephone network;

monitoring each of the plurality of parallel branches to determine if a fault occurs on a monitored branch that would adversely affect the operation of the remainder of the parallel branches of the premises circuit;

upon detecting such a fault, disconnecting the faulty branch from the premises circuit;

sustaining normal operating conditions on the disconnected faulty branch so that the remaining parallel branches of the premises telephone circuit remain operational after the disconnected faulty branch is disconnected: and automatically reconnecting the premises circuit to the external telephone network upon detecting that the premises circuit and the external telephone network are operating normally.

11. The method of claim 10, further comprising the steps of:

continuing to monitor the disconnected faulty branch after the faulty branch is disconnected from the premises circuit; and upon detecting that the disconnected faulty branch is corrected, automatically reconnecting the corrected branch to the premises circuit.

* * * * *